US008293368B2

(12) United States Patent
Jucker et al.

(10) Patent No.: US 8,293,368 B2
(45) Date of Patent: Oct. 23, 2012

(54) MOISTURE-CURABLE COMPOSITION FEATURING INCREASED ELASTICITY

(75) Inventors: Barbara Jucker, Zurich (CH); Pierre-Andre Butikofer, Wallisellen (CH); Urs Burckhardt, Zurich (CH); Ueli Pfenninger, Au (CH)

(73) Assignee: Sika Technology AG, Baar (CH)

( * ) Notice: Subject to any disclaimer, the term of this patent is extended or adjusted under 35 U.S.C. 154(b) by 1076 days.

(21) Appl. No.: 11/887,818

(22) PCT Filed: Apr. 28, 2006

(86) PCT No.: PCT/EP2006/061915
§ 371 (c)(1),
(2), (4) Date: Oct. 26, 2007

(87) PCT Pub. No.: WO2006/117338
PCT Pub. Date: Nov. 9, 2006

(65) Prior Publication Data
US 2009/0075086 A1    Mar. 19, 2009

(30) Foreign Application Priority Data

Apr. 29, 2005   (EP) .................................. 05103564

(51) Int. Cl.
C08G 77/26    (2006.01)
C08G 77/18    (2006.01)
B32B 37/00   (2006.01)

(52) U.S. Cl. ..................... 428/411.1; 428/446; 428/448; 528/25; 528/26; 528/28

(58) Field of Classification Search ........................ None
See application file for complete search history.

(56) References Cited

U.S. PATENT DOCUMENTS

| 4,543,403 A * | 9/1985 | Isayama et al. ............... 526/263 |
| 4,562,237 A * | 12/1985 | Okuno et al. .................. 528/17 |
| 4,593,068 A * | 6/1986 | Hirose et al. ................. 525/100 |
| 4,707,526 A * | 11/1987 | Sasaki et al. .................. 525/404 |
| 4,837,401 A * | 6/1989 | Hirose et al. .................. 525/364 |
| 4,906,707 A * | 3/1990 | Yukimoto et al. ............ 525/403 |
| 4,910,255 A * | 3/1990 | Wakabayashi et al. ....... 525/100 |
| 4,923,927 A * | 5/1990 | Hirose et al. ................. 525/100 |
| 5,164,461 A * | 11/1992 | Mitchell et al. ............... 525/478 |
| 5,364,955 A * | 11/1994 | Zwiener et al. ............... 556/418 |
| 5,596,044 A * | 1/1997 | Gindin et al. ................. 525/131 |
| 5,659,001 A * | 8/1997 | de la Croi et al. ............. 528/17 |
| 6,001,946 A * | 12/1999 | Waldman et al. .............. 528/28 |
| 6,111,010 A * | 8/2000 | Yu et al. ......................... 524/588 |
| 6,162,938 A * | 12/2000 | Hansen et al. ................. 556/419 |
| 6,444,325 B1 * | 9/2002 | Roesler et al. ................ 428/447 |
| 6,545,087 B1 * | 4/2003 | Schmalstieg et al. .......... 525/38 |
| 6,809,170 B2 * | 10/2004 | Roesler et al. ................ 528/28 |
| 6,844,413 B2 * | 1/2005 | Roesler et al. ................ 528/28 |
| 6,887,964 B2 * | 5/2005 | Frisch et al. .................. 528/28 |
| 6,989,429 B2 * | 1/2006 | Feng ............................. 528/28 |
| 7,091,298 B2 * | 8/2006 | Schindler et al. ............. 528/34 |
| 7,465,778 B2 * | 12/2008 | Roesler et al. ................ 528/28 |
| 2004/0181025 A1 | 9/2004 | Schindler et al. |
| 2004/0204539 A1 * | 10/2004 | Schindler et al. ............ 524/588 |
| 2005/0101753 A1 | 5/2005 | Schindler et al. |
| 2005/0137323 A1 * | 6/2005 | Roesler et al. ............... 524/589 |
| 2006/0183846 A1 * | 8/2006 | Pfenninger et al. .......... 524/588 |
| 2007/0167598 A1 | 7/2007 | Stanjek et al. |
| 2009/0012322 A1 * | 1/2009 | Bockholt et al. .............. 556/421 |

FOREIGN PATENT DOCUMENTS

| CA | 2348566 A1 | 5/2000 |
| CA | 2377197 A1 | 1/2001 |
| EP | 0 459 300 A2 | 12/1991 |
| EP | 0 831 108 A1 | 3/1998 |
| EP | 0 864 575 A2 | 9/1998 |
| EP | 0 949 308 A1 | 10/1999 |
| EP | 1 529 813 A1 | 5/2005 |
| JP | 63-083167 | 4/1988 |
| JP | A-6-211879 | 8/1994 |
| JP | A-10-204144 | 8/1998 |
| JP | A-10-251272 | 9/1998 |
| JP | A-2000-128944 | 5/2000 |
| JP | A-2002-528612 | 9/2002 |
| JP | A-2003-503564 | 1/2003 |
| JP | A-2004-536957 | 12/2004 |
| JP | A-2005-139452 | 6/2005 |
| WO | WO 03/014226 A1 | 2/2003 |
| WO | WO 2005/032201 A2 | 1/2005 |

OTHER PUBLICATIONS

Oct. 4, 2011 Office Action issued in Japanese Patent Application No. 2008-508233.

* cited by examiner

*Primary Examiner* — Robert S Loewe
(74) *Attorney, Agent, or Firm* — Oliff & Berridge, PLC

(57) ABSTRACT

The invention relates to moisture-curable compositions that air provided with increased elasticity while having good mechanical properties and adhesion. Said compositions contain at least on silane-functional polymer A, at least one aminosilane AS2, and at least one α-functional organodialkoxysilane at an amount of 0.6 to 5.0 parts by weight relative to 100 parts by weight of polymer A. Also disclosed are the production and use of the inventive compositions, especially as a sealant and adhesive.

24 Claims, No Drawings

MOISTURE-CURABLE COMPOSITION FEATURING INCREASED ELASTICITY

TECHNICAL FIELD

Moisture-curing composition having good mechanical properties and good adhesion properties, comprising at least one silane-functional polymer and at least one α-functional organodialkoxysilane, suitable as an elastic adhesive, as an elastic sealant or coating.

PRIOR ART

Moisture-curing compositions based on silane-functional polymers are known, and their uses include elastic adhesives, most sealants, and coatings, all free from isocyanate groups potentially detrimental to health. For the majority of these applications, as a joint sealant or as an assembly adhesive, for example, it is critical for the composition in the cured state to possess good mechanical properties and good adhesion properties. Particularly important is a combination of high extensibility with high tensile strength. Compositions of this kind often fail to satisfy these requirements.

The use of organoalkylsilanes as additives in moisture-curing compositions based on silane-functional polymers is known. They are typically employed in order to exert a targeted influence over properties such as adhesion, storage stability, and reactivity, as described in U.S. Pat. No. 3,979,344, U.S. Pat. No. 5,147,927 and EP 0 819 749 A2, for example. From U.S. Pat. No. 3,979,344, for example, the use is known, for example, of N-(2-aminoethyl)-3-amino-propyltrimethoxysilane for achieving good adhesion properties.

WO 03/014226 A1 describes alkoxy-crosslinking one-component sealants based on alkoxyorganosilane-terminated polymers featuring good storage stability and curing characteristics, the sealants having organoalkoxysilanes added to them in relatively large quantities, as drying agents, from a broad range of α-functional silanes.

EXPOSITION OF THE INVENTION

Given the state of the art, a need exists for an isocyanate-free moisture-curing composition which features increased extensibility in conjunction with high reactivity, good adhesion properties, and high tensile strength.

Surprisingly it has been found that moisture-curing compositions of claim 1, comprising certain silane-functional polymers, and comprising at least one aminosilane as accelerant and adhesion promoter, exhibit a significantly increased extensibility in the cured state, as a result of the accompanying use of defined amounts of certain α-functional organodialkoxysilanes, while retaining good reactivity, tensile strength, and adhesion.

Experience shows that moisture-curing compositions comprising silane-functional polymers are substantially improved in their adhesion properties as a result of the accompanying use of aminosilanes such as N-(2-aminoethyl)-3-aminopropyltrimethoxysilane. The presence of aminosilanes, such as N-(2-aminoethyl)-3-aminopropyltrimethoxysilane, for example, unfortunately leads to unwanted detractions from the extensibility of the cured composition. If, on the other hand, a combination of an aminosilane, such as N-(2-aminoethyl)-3-aminopropyltrimethoxysilane, for example, and a defined amount of certain α-functional organodialkoxysilanes is used in moisture-curing compositions comprising certain silane-functional polymers, then isocyanate-free moisture-curing compositions are obtainable which feature high reactivity, good adhesion properties, high tensile strengths, and significantly increased extensibility.

WAYS OF PERFORMING THE INVENTION

The invention provides moisture-curing compositions with increased extensibility, suitable as elastic adhesives, elastic sealants or coatings, comprising a) at least one silane-functional polymer A which either is a polymer A1 prepared by reacting a polyurethane polymer containing isocyanate groups with an aminosilane AS1, or is a polymer A2 prepared by hydrosilylating a polyether polymer having terminal double bonds, b) at least one aminosilane AS2, and c) at least one silane of the formula (I) in an amount of 0.6-5.0 parts by weight, based on 100 parts by weight of polymer A,

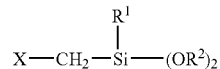

(I)

where $R^1$ is an alkyl group having from 1 to 8 C atoms, more particularly a methyl or an ethyl group, $R^2$ is an alkyl group having 1 to 5 C atoms, more particularly a methyl group or an ethyl group or an isopropyl group, and X is a substituent attached via a heteroatom.

The term "polymer" in the present document embraces, on the one hand, a group of chemically uniform macromolecules which nevertheless differ in respect of degree of polymerization, molar mass, and chain length, prepared by a polymerization reaction (addition polymerization, polyaddition, polycondensation). On the other hand the term also embraces derivatives of such a group of macromolecules from polymerization reactions, in other words compounds which have been obtained by reactions, such as addition reactions or substitution reactions, for example, of functional groups on existing macromolecules and which may be chemically uniform or chemically nonuniform. The term further embraces what are known as prepolymers—that is, reactive oligomeric preadducts whose functional groups are involved in the construction of macromolecules.

The term "polyurethane polymer" encompasses all polymers which are prepared by the diisocyanate polyaddition process. This also includes those polymers which are virtually or entirely free from urethane groups, such as polyether-polyurethanes, polyester-polyurethanes, polyether-polyureas, polyureas, poly-ester-polyureas, polyisocyanurates, polycarbodiimides, and so on.

The term "organoalkoxysilane", or "silane" for short, is used in the present document to refer to compounds in which firstly there are at least one, typically two or three, alkoxy group(s) attached directly to the silicon atom (via an Si—O bond) and which, secondly, have at least one organic radical attached directly to the silicon atom (via an Si—C bond). Correspondingly, the term "silane group" refers to the silicon-containing group attached to the organic radical of the organoalkoxysilane. The organoalkoxysilanes, or their silane groups, have the property of hydrolyzing on contact with moisture. This hydrolysis is accompanied by the formation of organosilanols, i.e., organosilicon compounds containing one or more silanol groups (Si—OH groups) and, as a result of subsequent condensation reactions, of organosiloxanes, i.e., organosilicon compounds containing one or more siloxane groups (Si—O—Si groups).

The term "α-functional organodialkoxysilane" identifies a silane as depicted in formula (I) which on its silicon carries not only a methylene group but also two alkoxy groups, the methylene group carrying a functional group which is therefore positioned α to the silicon atom. Silanes referred to as "γ-functional" are those which carry, on the organic radical, a functional group positioned γ to the silicon atom.

Terms such as "aminosilane" and "isocyanatosilane" refer to silanes which have the corresponding functional group, in this case, accordingly, aminoalkylalkoxysilanes and isocyanatoalkylalkoxysilanes.

The term "silane-functional" refers to compounds, more particularly polymers, which have silane groups.

The moisture-curing composition comprises at least one silane of the formula (I) in an amount of 0.6-5.0 parts by weight, preferably 0.6-3.5 parts by weight, based on 100 parts by weight of polymer A,

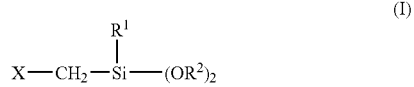

(I)

where $R^1$ is an alkyl group having 1 to 8 C atoms, more particularly a methyl or a ethyl group, $R^2$ is an alkyl group having 1 to 5 C atoms, more particularly a methyl group or an ethyl group or an isopropyl group, and X is a radical which is attached via a heteroatom and is selected from the group encompassing —$NHR^3$, —NH-$COOR^4$, —SH, —$OR^4$, $R^4COO$—, $CH_2=C(CH_3)COO$—, and $CH_2=CHCOO$—, where $R^3$ is a hydrogen atom or is a linear or branched hydrocarbon radical having 1 to 20 C atoms, which optionally contains cyclic fractions, or is a radical of the formula (II)

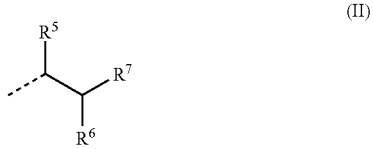

(II)

where $R^5$ and $R^6$, independently of one another, is a hydrogen atom or is a radical from the group encompassing $R^8$, —$COOR^8$, and —CN, and $R^7$ is a hydrogen atom or is a radical from the group encompassing —$CH_2$—$COOR^6$, —$COOR^6$, —CN, —$NO_2$, —$PO(OR^8)_2$, —$SO_2R^8$ and —$SO_2OR^8$, where $R^8$ is a hydrocarbon radical having 1 to 20 C atoms and optionally containing at least one heteroatom, and $R^4$ is an optionally substituted hydrocarbon radical having 1 to 20 C atoms.

Dashed lines in the formulae in each case identify the bonding sites.

The following silanes (I) are preferred:

N-phenylaminomethyldimethoxymethylsilane, N-cyclohexyl-aminomethyldimethoxymethylsilane, N-methylaminomethyl-dimethoxymethylsilane, N-ethylaminomethyldimethoxy-methylsilane, N-propylaminomethyldimethoxymethylsilane, N-butylaminomethyldimethoxymethylsilane, (methacryloyl-oxymethyl)-dimethoxymethylsilane, N-(dimethoxymethyl-silylmethyl)-O-methylcarbamate, the products from the Michaellike addition reaction of aminomethyldimethoxymethylsilane with Michael acceptors such as maleic diesters, fumaric diesters, citraconic diesters, acrylic esters, methacrylic esters, cinnamic esters, itaconic diesters, vinylphosphonic diesters, vinylsulfonic aryl esters, vinyl sulfones, vinyl nitriles, 1-nitroethylenes or Knoevenagel condensation products such as those, for example, of malonic diesters and aldehydes such as formaldehyde, acetaldehyde or benzaldehyde.

Some of the preferred silanes (I) are available commercially. The Michaellike addition products can be prepared in a simple way under the reaction conditions described in U.S. Pat. No. 5,364,955 for γ-functional aminosilanes.

The moisture-curing composition further comprises at least one aminosilane AS2. This aminosilane accelerates the curing of the composition and enhances its adhesion properties in the cured state. It has been found that these effects are achieved in particular by using the aminosilane AS2 in the range of 0.1% -5% by weight, preferably 0.3% -3% by weight, based on the overall composition. It is advantageous to use only the amount of aminosilane AS2 needed in order to achieve optimum adhesion properties, since it has been found that, in a larger amount, the aminosilane AS2 may lower the extensibility of the cured composition. Based on 100 parts by weight of polymer A, the aminosilane AS2 is present typically in an amount of 0.3 to 10 parts by weight.

Suitable aminosilanes AS2 are aminosilanes having at least one primary amino group ($NH_2$ group), such as 3-aminopropylsilanes and their derivatives, for example. Particularly suitable aminosilanes AS2 are what are called diamino silanes, which have two amino groups, more preferably those which carry one primary amino group and, positioned γ to the silicon atom, a secondary amino group (NH group), such as N-(2-aminoethyl)-3-aminopropylsilanes, for example. Particular preference is given to N-(2-aminoethyl)-3-aminopropyltrimethoxysilane and N-(2-aminoethyl)-3-aminopropyltriethoxysilane.

The moisture-curing composition further comprises at least one silane-functional polymer A. Suitability as silane-functional polymer A is possessed on the one hand by silane-functional polyurethane polymers A1, which are obtainable through the reaction of an aminosilane AS1 with a polyurethane polymer containing isocyanate groups. This reaction is preferably conducted in a stoichiometric ratio between amino groups and isocyanate groups, or with a slight excess of amino groups, so that the resulting silane-functional polyurethane polymer A1 is entirely free from isocyanate groups.

Suitable aminosilanes AS1 for preparing such a polymer A1 are, more particularly, compounds of the formula (III)

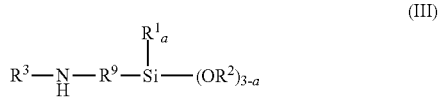

(III)

where
R¹, R² and R³ have the definition already described,
a is 0 is 1, and
R⁹ is a linear or branched, optionally cyclic, alkylene group having 2 to 12 C atoms, where appropriate with aromatic fractions, and where appropriate with one or more heteroatoms, more particularly nitrogen atoms.

Examples of suitable aminosilanes AS1 are 3-aminopropyltrimethoxysilane, 3-aminopropyldimethoxy-methylsilane, N-butyl-3-aminopropyltrimethoxysilane, N-phenyl-3-aminopropyltrimethoxysilane, the products of the Michaellike addition reaction of 3-aminopropyldimethoxymethylsilane or 3-aminopropyl-trimethoxysilane with Michael acceptors such as acrylonitrile, acrylic and methacrylic esters, maleic and fumaric diesters, citraconic diesters, and itaconic diesters, examples being dimethyl and diethyl N-(3-trimethoxysilylpropyl)aminosuccinate and also the stated silanes with ethoxy groups instead of the methoxy groups on the silicon. Particularly suitable aminosilanes AS1 are those having a secondary amino group. Preference is given to the Michaellike addition products, more particularly to diethyl N-(3-trimethoxy-silylpropyl)aminosuccinate.

Suitability as a polyurethane polymer containing isocyanate groups for preparing a silane-functional polyurethane polymer A1 is possessed by polymers which are obtainable through the reaction of at least one polyisocyanate with at least one polyol.

This reaction can be accomplished by reacting the polyol and the polyisocyanate by typical processes, at temperatures for example of 50° C. to 100° C., where appropriate with the accompanying use of suitable catalysts, the amount of polyisocyanate introduced being such that its isocyanate groups are present in a stoichiometric excess in relation to the hydroxyl groups of the polyol. The excess of polyisocyanate is selected such that the resulting polyurethane polymer, following the reaction of all of the polyol hydroxyl groups, has a free isocyanate group content of 0.1% -5% by weight, preferably 0.25-2.5% by weight, more preferably 0.3% -1% by weight, based on the overall polymer, left. Where appropriate the polyurethane polymer may be prepared with the accompanying use of plasticizers, in which case the plasticizers used contain no isocyanate-reactive groups.

Preferred polyurethane polymers are those having the stated free isocyanate group content and obtained from the reaction of diisocyanates with high molecular weight diols in an NCO/OH ratio of 1.5/1 to 2/1.

Polyols which can be used for preparing a polyurethane polymer containing isocyanate groups include, for example, the following commercially customary polyols or any desired mixtures of them:

polyoxyalkylene polyols, also called polyether polyols, which are polymerization products of ethylene oxide, 1,2-propylene oxide, 1,2- or 2,3-butylene oxide, tetrahydrofuran or mixtures thereof, optionally polymerized with the aid of a starter molecule having two or more active hydrogen atoms such as, for example, water, ammonia or compounds having two or more OH or NH groups such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol-A, hydrogenated bisphenol-A, 1,1,1-trimethylolethane, 1,1,1-tri-methylolpropane, glycerol, aniline, and mixtures of the aforementioned compounds. It is possible to use not only polyoxyalkylene polyols which have a low degree of unsaturation (measured in accordance with ASTM D-2849-69 and reported as milliequivalents of unsaturation per gram of polyol (mEq/g)), prepared for example using what are called double metal cyanide complex catalysts (DMC catalysts), but also polyoxyalkylene polyols having a higher degree of unsaturation, prepared for example with the aid of anionic catalysts such as NaOH, KOH or alkali metal alkoxides;

polyester polyols, polyacrylate polyols, and polymethacrylate polyols.

These stated polyols have an average molecular weight of 250 to 30 000 g/mol and an average OH functionality in the range from 1.6 to 3. By "molecular weight" or "molar weight" in the present document is meant always the molecular weight average $M_n$.

Particular suitability is possessed by polyoxyalkylene diols, more particularly polyoxypropylene diols.

Especially suitable are high molecular weight polyoxypropylene diols having a degree of unsaturation of less than 0.02 mEq/g and having a molecular weight in the range from 4000 to 30 000 g/mol, more particularly those having a molecular weight in the range from 8000 to 20 000 g/mol.

A polyurethane polymer containing isocyanate groups is prepared using commercially customary polyisocyanates. Examples of suitable polyisocyanates are 2,4- and 2,6-tolylene diisocyanate (TDI) and any desired mixtures of these isomers, 4,4'-, 2,4'-, and 2,2'-diphenylmethane diisocyanate (MDI) and any desired mixtures of these and further isomers, 1,3- and 1,4-phenylene diisocyanate, 2,3,5,6-tetramethyl-1,4-diisocyanatobenzene, 1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, cyclohexane 1,3- and 1,4-diisocyanate and any desired mixtures of these isomers, 1-isocyanato-3,3,5-trimethyl-5-isocyanatomethylcyclohexane (i.e. isophorone diisocyanate or IPDI), perhydro-2,4'- and -4,4'-diphenylmethane diisocyanate (HMDI), 1,4-diisocyanato-2,2,6-trimethylcyclohexane (TMCDI), m- and p-xylylene diisocyanate (XDI), 1,3- and 1,4-tetramethylxylylene diisocyanate (TMXDI), 1,3- and 1,4-bis(isocyanatomethyl)cyclohexane, oligomers and polymers of the aforementioned isocyanates, and also any desired mixtures of the aforementioned isocyanates. Preference is given to MDI, TDI, HDI, and IPDI.

It is not preferred for the aminosilane AS1 used to prepare a silane-functional polyurethane polymer A1 to be identical to the aminosilane AS2 that is additionally present. Suitability as aminosilane AS2 is possessed in particular by aminosilanes having a primary amino group, preferably diaminosilanes having a primary amino group and, positioned γ to the silicon atom, a secondary amino group, since it has been found that the use of such aminosilanes has a particularly positive influence on the adhesion properties of the cured composition. Particularly suitable as aminosilane AS1, in contrast, are aminosilanes having solely a secondary amino group, since it has been found that, using this kind of aminosilanes, silane-functional polyurethane polymers A1 are obtained which are generally less viscous and, in the cured state, less brittle than when aminosilanes having primary amino groups are used to prepare silane-functional polyurethane polymers A1.

Suitability as silane-functional polymer A is possessed, on the other hand, by polymers A2 which contain silane groups and are obtainable by a hydrosilylation reaction of polymers having terminal double bonds, poly(meth)acrylate polymers or polyether polymers for example, more particularly of allylterminated polyoxyalkylene polymers, with silanes, described for example in U.S. Pat. No. 3,971,751 and U.S. Pat. No. 6,207,766.

Examples of commercially available silane-functional polymers A2 are the products having the trade names MS-Polymer H203S, MS-Polymer H303S, Silyl Sax® 220, Silyl Sax®350 and Silyl Sax®400 (all from Kaneka); Polymer ST50 (from Hanse-Chemie); Excestar® ES-S2410, ES-S2420, ES-S3430, and ES-S3630 (all from Asahi); and WSP 627 and WSP 725/80 (both from Witton Chemical).

Not suitable as silane-functional polyurethane polymer A1 are, in particular, polymers of the kind obtained by reacting an isocyanatosilane with a hydroxyl-containing polymer, as are described in U.S. Pat. No. 4,345,053, for example. Moisture-curing compositions which comprise this kind of polymers and an N-(2-aminoethyl)-3-aminopropylsilane show no significant increase in extensibility when silanes of the formula (I) are used accompanyingly.

Further to the silane-functional polymer A, the aminosilane AS2, and the silane (I), the moisture-curing composition of the invention may comprise further components which, however, do not adversely affect the storage stability, in other words lack the capacity to trigger to a significant degree, during storage, the pro-crosslinking reaction of the silane groups present in the composition. In particular this means that such further components must contain no water or no more than traces of water. Additional components may include the following auxiliaries and additives:

plasticizers, examples being esters of organic carboxylic acids or their anhydrides, such as phthalates, dioctyl phthalate or diisodecyl phthalate for example, adipates, dioctyl adipate for example, and sebacates, polyols, examples being polyoxyalkylene polyols or polyester polyols, organic phosphoric and sulfonic esters or polybutenes; solvents; organic and inorganic fillers, such as ground or precipitated calcium carbonates, which may have been coated with stearates, more particularly finely divided coated calcium carbonate, carbon blacks, kaolins, aluminas, silicas, PVC powders or hollow beads; fibers, of polyethylene for example; pigments; catalysts, examples being organotin compounds such as dibutyltin dilaurate and dibutyltin diacetylacetonate, organobismuth compounds or bismuth complexes, compounds containing amino groups, such as 1,4-diazabicyclo[2.2.2]octane and 2,2'-dimorpholinodiethyl ether, for example; rheology modifiers such as, for example, thickeners, examples being urea compounds, polyamide waxes, bentonites or fumed silicas; further adhesion promoters, epoxy silanes for example; crosslinkers, examples being silane-functional oligomers and polymers; drying agents, exemplified by vinyltrimethoxysilane, orthoformic esters, calcium oxide or molecular sieves; stabilizers against heat, light radiation and UV radiation; flame retardants; surface-active substances such as, for example, wetting agents, flow control agents, deaerating agents or defoamers; fungicides or fungal growth inhibitors; and other substances typically employed in moisture-curing compositions.

The moisture-curing composition preferably comprises vinyltrimethoxysilane as a drying agent. A drying agent is used in order to convert traces of moisture, which pass into the composition primarily by way of solid components such as fillers or pigments, before they can react with the silane groups of the polymer. Vinyltrimethoxysilane is an efficient and substantially more cost-effective drying agent than the α-functional silanes WO 03/014226 A1 describes. The use of vinyltrimethoxysilane in combination with the silane-functional polymers A leads to moisture-curing compositions having particularly good storage stability.

In one preferred embodiment the moisture-curing composition contains at least 0.5% by weight, more preferably at least 0.7% by weight, of vinyltrimethoxysilane, based on the overall composition.

Preference is given to a process for preparing a moisture-curing composition of the invention that involves contacting the solid components, such as fillers and pigments, which from experience contain significant traces of moisture, with the vinyltrimethoxysilane before the silane (I) is added.

The moisture-curing composition described is kept in the absence of moisture. It is stable on storage, which means that in the absence of moisture it can be kept in suitable packaging or a suitable contrivance, such as a drum, a pouch or a cartridge, for example, for a period ranging from several months up to a year or more, without undergoing alteration to any service-relevant extent in its application properties or in its properties after curing.

With regard to the application of the moisture-curing composition described, the surface of at least one arbitrary solid or article is contacted wholly or partly with the composition. Preference is given to uniform contacting in the form of an adhesive or a sealant, a coating or a covering. It may well be the case that, prior to the contacting, the solid(s) or article(s) to be contacted must be subjected to a physical and/or chemical pretreatment, as for example by abrading, sandblasting, brushing or the like, or by treatment with cleaners, solvents, adhesion promoters, adhesion promoter solutions or primers, or the application of a tie coat or a sealer.

When the moisture-curing composition described is applied to at least one solid or article, the silane groups of the polymer and of the silanes come into contact with moisture. The silane groups have the capacity to undergo hydrolysis on contact with moisture. In doing so they form organosilanols (organosilicon compounds containing one or more silanol groups, Si—OH groups) and, by means of subsequent condensation reactions, form organosiloxanes (organosilicon compounds containing one or more siloxane groups, Si—O—Si groups). As a result of these reactions the composition ultimately cures; this process is also referred to as crosslinking. Alternatively, the water needed for the curing reaction can come from the air (atmospheric humidity), or else the composition can be contacted with a water-containing component, by being spread-coated, for example, with a smoothing agent, or by being sprayed, or else the composition during application can have a water-containing component added to it, in the form for example of a hydrous paste, which is mixed in by way of a static mixer, for example.

In the cured state, the moisture-curing composition described has a surprising high extensibility and at the same time possesses good storage stability, high reactivity, good adhesion properties, and a high tensile strength. As compared with an analogous composition containing no silane of the formula (I), it has a significantly higher extensibility with properties that are otherwise of comparable quality.

Surprisingly it has been found that the extensibility of the moisture-curing composition which comprises a silane-functional polymer A and an aminosilane AS2, such as N-(2-aminoethyl)-3-aminopropyltrimethoxysilane, for example, is significantly increased through the accompanying use of 0.6-5.0 parts by weight, preferably 0.6-3.5 parts by weight, of a silane (I), based on 100 parts by weight of polymer A. If, in contrast, α-functional silanes having three alkoxy groups on the silicon, of the kind mentioned in the examples in WO 03/014226 A1, or γ-functional organodialkoxysilanes are used instead of the α-functional organodialkoxysilanes represented in formula (I), then no significant increase is observed in the extensibility for compositions in the cured state.

Where less than 0.6 part by weight of a silane (I) is used, based on 100 parts by weight of polymer A, the increase in extensibility is too slight to exert any relevant influence on the properties of an elastic adhesive, an elastic sealant or a coating. Where more than 3.5 parts by weight, in particular more than 5.0 parts by weight, of a silane (I) are used, based on 100 parts by weight of polymer A, the extensibility in the cured state is not increased further; instead, the tensile strength falls significantly, which is undesirable for the use of the above-described compositions as an elastic adhesive, elastic sealant or coating.

The moisture-curing composition described cures rapidly on contact with moisture. In the cured state it possesses a high mechanical strength in tandem with a surprisingly high extensibility, and also possesses good adhesion properties. It is suitable for use as an elastic adhesive, elastic sealant or coating. More particularly it is suitable for applications which impose exacting requirements on the extensibility, at the same time as exacting requirements in terms of strength, adhesion properties, and reactivity. Examples of such applications are adhesives, sealants or coatings in industrial manufacture or repair or in civil engineering or construction or the interior fitment of means of transport or built structures.

Specific mention is made of applications as an elastic adhesive in the context of the manufacturer of water or land vehicles, preferably automobiles, buses, trucks, trains or ships, and also applications as an elastic sealant in the context of the manufacturer of means of transport or built structures.

When the moisture-curing composition described is used as an adhesive, sealant or coating, there are different processes that can be employed in principle.

One embodiment provides a method of adhesively bonding two substrates S1 and S2, which comprises the following steps:
applying the composition to the surface of the substrate S1;
contacting the surface of the substrate S2 with the composition which is disposed on the substrate S1;
and curing the composition by contact with moisture.
The substrates S1 and S2 here may be alike or different from one another.

A further embodiment provides a method of sealing which comprises the following steps:
applying the composition between the surfaces of two substrates S1 and S2;
and curing the composition by contact with moisture.
The substrates S1 and S2 here may be alike or different from one another.

A further embodiment provides a method of adhesive bonding or of sealing in which at least one of the substrates, S1 or S2—apart from any cleaning carried out with a solvent—is not pretreated by a chemical or physicochemical method. In particular no primer is applied.

A further embodiment provides a method of adhesive bonding or of sealing in which at least one of the substrates S1 or S2, is a metal or a metal alloy, more particularly steel, aluminum, a nonferrous metal or a galvanized metal.

Examples of suitable substrates S1 or S2 are inorganic substrates such as, for example, glass, glass-ceramic, concrete, mortar, brick, tile, plaster, and natural minerals such as granite or marble; metals or alloys such as aluminum, steel, nonferrous metals, galvanized metals; organic substrates such as wood, plastics such as PVC, polycarbonates, PMMA, polyesters, epoxy resins; coated substrates such as, for example, powder-coated metals or alloys; and also inks and paints, more particularly automobile topcoats.

EXAMPLES

Description of Test Methods

The tensile strength, the breaking extension, the elasticity modulus at 0% -5% extension, and the stress at 100% extension were determined in accordance with DIN EN 53504 (tensioning speed: 200 mm/min) on 2 mm films cured at 23° C. and 50% relative humidity for 7 days and then at 40° C. for 7 days.

The Shore A hardness was determined in accordance with DIN 53505.

The adhesion to V2A-grade stainless steel and to eloxed aluminum (alu elox for short) was determined as follows: A plaque of the corresponding material (V2A steel or eloxed aluminum) was cleaned with ethanol and then coated, without further pretreatment, with a bead of the composition under test. The plaque coated with the bead was then stored under standard conditions (23±1° C., 50±5% relative humidity) for 7 days, in the course of which the composition underwent curing. To test the adhesion, an incision was made into the cured bead at one end, down to just above the surface of the plaque (bond line). The incised end of the bead was held by hand and then pulled carefully and slowly from the plaque surface with a peeling action, in the direction of the other end of the bead. If, in the course of this peeling process, the adhesion was so strong that the end of the bead threatened to tear off when being pulled, a cutter was used to apply a cut perpendicular to the direction of bead pull, down to the bare surface of the plaque, and in this way a section of the bead was detached. Cuts of this kind were repeated, if necessary, in the course of continued pulling, at intervals of 2 to 3 mm. In this way the entire bead was pulled and/or cut from the plaque. The adhesion was identified with "yes" if at least 75% of the adhesion area had undergone cohesive detachment. An identification "no" was awarded for the adhesion if not more than 25% of the adhesion area had undergone cohesive detachment, or if virtually the entire adhesion area had undergone adhesive detachment, and the adhesion was identified with "partial" if approximately half of the adhesion area had undergone cohesive detachment.

Abbreviations Used in the Tables
ref. reference
inv. inventive
comp. comparison
ppw part by weight
A1120 Silquest® A-1120 (GE Advanced Materials): N-(2-aminoethyl)-3-aminopropyltrimethoxysilane
XL972 Geniosil® XL 972 (Wacker): (N-phenyl-aminomethyl)-dimethoxymethylsilane
XL924 Geniosil® XL 924 (Wacker): (N-cyclohexyl-aminomethyl)-diethoxymethylsilane
XL65 Geniosil® X 65 (Wacker): N-(dimethoxy-methylsilyl-methyl)-O-methylcarbamate
XL32 Geniosil® XL 32 (Wacker): (methacryloyl-oxymethyl)-dimethoxymethylsilane
XL34 Geniosil® XL 34 (Wacker): (methacryloyloxymethyl)-diethoxymethylsilane
XL926 Geniosil® XL 926 (Wacker): (N-cyclohexylaminomethyl)-triethoxysilane
XL63 Geniosil® XL 63 (Wacker): N-(trimethoxysilyl-methyl)-O-methylcarbamate
XL33 Geniosil® XL 33 (Wacker): (methacryloyl-oxymethyl)-trimethoxysilane A2120 Silquest® A-2120 (GE Advanced Materials): N-(2-aminoethyl)-3-aminopropyldimethoxymethyl-silane A1110 Silquest® A-1110 (GE Advanced Materials): 3-aminopropyltrimethoxysilane A1100 Silquest® A-1100 (GE Advanced Materials): 3-aminopropyltriethoxysilane a) Preparation of Silane-Functional Polymers Polymer 1

Under a nitrogen atmosphere, 1000 g of Polyol Acclaim® 12200 (Bayer; low monol polyoxypropylene diol, OH number 11.0 mg KOH/g, water content about 0.02% by weight), 43.6 of isophorone diisocyanate (IPDI; Vestanat® IPDI, Degussa), 126.4 g of diisodecyl phthalate (DIDP; Palatinol® Z, BASF), and 0.12 g of di-n-butyltin dilaurate were heated to 90° C. with continuous stirring and were left at this temperature until the free isocyanate group content as determined by titrimetry had reached a level of 0.63% by weight. Subsequently, 62.3 g of diethyl N-(3-trimethoxysilyl-propyl)amino succinate were mixed in and the mixture was stirred at 90° C. for 4 hours until free isocyanate was no longer detected by means of IR spectroscopy. The product was cooled to room temperature and stored in the absence of moisture (theoretical polymer content=89.7%).

Diethyl N-(3-trimethoxysilylpropyl)amino succinate was prepared as follows: 51.0 g of 3-aminopropyl-trimethoxysilane (Silquest® A-1110, GE Advanced Materials) were introduced as an initial charge. Slowly and with thorough stirring, at room temperature, 49.0 g of diethyl maleate were added and the mixture is stirred at room temperature for 8 hours.

Polymer 2

Under a nitrogen atmosphere, 1000 g of Acclaim® 12200 (Bayer; low monol polyoxypropylene diol, OH number 11.0 mg KOH/g, water content about 0.02% by weight), 36.1 of isophorone diisocyanate (IPDI; Vestanat® IPDI, Degussa), 292.3 g of diisodecyl phthalate (DIDP; Palatinol® Z, BASF), and 0.23 g of di-n-butyltin dilaurate were heated to 90° C. with continuous stirring and were left at this temperature until the free isocyanate group content as determined by titrimetry had reached a level of 0.33% by weight. Subsequently, 37.7 g of diethyl N-(3-trimethoxysilylpropyl)amino succinate were mixed in and the mixture was stirred at 90° C. for 4 hours until free isocyanate was no longer detected by means of IR spectroscopy. The product was cooled to room temperature and stored in the absence of moisture (theoretical polymer content=78.6%).

Diethyl N-(3-trimethoxysilylpropyl)amino succinate was prepared as described for polymer 1.

Polymer 3 (Comparison)

Under a nitrogen atmosphere, 3085.8 g of Acclaim® 12200 (Bayer; low monol polyoxypropylene diol, OH number 11.0 mg KOH/g, water content about 0.02% by weight), 138.3 g of 3-isocyanatopropyltrimethoxysilane (Geniosil® GF 40, Wacker), and 0.23 g of di-n-butyltin dilaurate were heated to 90° C. with continuous stirring and were left at this temperature until free isocyanate was no longer detected by means of IR spectroscopy. The product was cooled to room temperature and stored in the absence of moisture (theoretical polymer content=100%).

b) Preparation of Adhesives

Preparation of Adhesive Base Formulation 1 (G1)

In a vacuum mixer, 3300 g of polymer 1, 1500 g of diisodecyl phthalate (DIDP: Palatinol® Z, BASF), 100 g of vinyltrimethoxysilane (Silquest® A-171, GE Advanced Materials), 4500 g of finely divided coated chalk (Socal® U1S2, Solvay, dried), 250 g of fumed silica (Aerosil® 200, Degussa, dried), and 10 g of di-n-butyltinyl dilaurate were processed to a homogeneous paste which was stored in the absence of moisture.

Preparation of Adhesive Base Formulation 2 (G2)

In a vacuum mixer, 3300 g of MS-polymer S303H (Kaneka), 1500 g of diisodecyl phthalate (DIDP: Palatinol® Z, BASF), 100 g of vinyltrimethoxysilane (Silquest® A-171, GE Advanced Materials), 4500 g of finely divided coated chalk (Socal® U1S2, Solvay, dried), 250 g of fumed silica (Aerosil® 200, Degussa, dried), and 20 g of di-n-butyltinyl dilaurate were processed to a homogeneous paste which was stored in the absence of moisture.

Preparation of Adhesive Base Formulation 3 (G3) (Comparison)

In a vacuum mixer, 3300 g of polymer 3, 1500 g of diisodecyl phthalate (DIDP: Palatinol® Z, BASF), 100 g of vinyltrimethoxysilane (Silquest® A-171, GE Advanced Materials), 4500 g of finely divided coated chalk (Socal® U1S2, Solvay, dried), 250 g of fumed silica (Aerosil® 200, Degussa, dried), and 10 g of di-n-butyltinyl dilaurate were processed to a homogeneous paste which was stored in the absence of moisture.

Preparation of Adhesives

In a vacuum mixer, the respective adhesive base formulation was mixed homogeneously with the silanes stated in tables 1 to 4, and the mixtures were stored in the absence of moisture.

Examples K1 to K10

Adhesives K2 to K10, shown in table 1, each contain the same fraction of diaminosilane Silquest® A-1120, which is an aminosilane AS2, and increasing amounts of Geniosil® XL 972, which is a silane of the formula (I). The reference adhesive K1 contains no silane (I).

TABLE 1

Adhesive formulations.

|  | K1 ref. | K2 comp. | K3 inv. | K4 inv. | K5 inv. | K6 inv. | K7 inv. | K8 comp. | K9 comp. | K10 comp. |
|---|---|---|---|---|---|---|---|---|---|---|
| Adhesive G1 [ppw] | 99 | 99 | 99 | 99 | 99 | 99 | 99 | 99 | 99 | 99 |
| A1120 [ppw] | 1.0 | 1.0 | 1.0 | 1.0 | 1.0 | 1.0 | 1.0 | 1.0 | 1.0 | 1.0 |
| XL972 [ppw] | — | 0.1 | 0.2 | 0.25 | 0.5 | 1.0 | 1.5 | 2.0 | 2.5 | 4.0 |
| ppw silane (I)/ppw polymer | — | 0.33/100 | 0.66/100 | 0.82/100 | 1.65/100 | 3.29/100 | 4.94/100 | 6.59/100 | 8.24/100 | 13.2/100 |

TABLE 1-continued

| | K1 ref. | K2 comp. | K3 inv. | K4 inv. | K5 inv. | K6 inv. | K7 inv. | K8 comp. | K9 comp. | K10 comp. |
|---|---|---|---|---|---|---|---|---|---|---|
| Tensile strength [MPa] | 2.8 | 2.8 | 2.9 | 2.9 | 2.9 | 3.4 | 2.9 | 2.3 | 1.9 | 1.6 |
| Breaking extension [%] | 360 | 370 | 400 | 450 | 480 | 630 | 640 | 640 | 640 | 650 |
| Elastic modulus [MPa] | 3.3 | 3.3 | 3.2 | 2.9 | 2.8 | 2.4 | 2.4 | 2.3 | 1.6 | 1.0 |
| Adhesion V2A to a steel | yes | yes | yes | yes | yes | yes | yes | yes | yes | yes |

The inventive adhesives K3 to K7, with an increasing amount of Geniosil® XL 972, exhibit a significant increase in breaking extension as compared with K1, the tensile strengths being at least as high, or higher, than those of K1. The comparison adhesive K2, which contains less than 0.6 part by weight of Geniosil® XL 972 to 100 parts by weight of polymer A, exhibits no significantly increased breaking extension. The comparison adhesives K8 to K10, which contain more than 5.0 parts by weight of Geniosil® XL 972 to 100 parts by weight of polymer A, do also have a high breaking extension, but the tensile strengths are lower than in the case of reference adhesive K1, a phenomenon which is unwanted.

Examples K11 to K14

The adhesives K1, K5, and K11 to K14, shown in table 2, contain different adhesive base formulations which differ essentially in the polymer they include. The respective reference adhesives K1, K11, and K13 contain no silane of formula (I), while the adhesives K5, K12 and K14 each contain 0.5 part by weight of Geniosil® XL 972. The polymer 3 included in adhesive base formulation G3 does not correspond to a silane-functional polymer A.

TABLE 2

| | K1 ref. | K5 inv. | K11 ref. | K12 inv. | K13 ref. | K14 comp. |
|---|---|---|---|---|---|---|
| Adhesive G1 [ppw] | 99 | 99 | — | — | — | — |
| Adhesive G2 [ppw] | — | — | 99 | 99 | — | — |
| Adhesive G3 [ppw] | — | — | — | — | 99 | 99 |
| A1120 [ppw] | 1.0 | 1.0 | 1.0 | 1.0 | 1.0 | 1.0 |
| XL 972 [ppw] | — | 0.5 | — | 0.5 | — | 0.5 |
| Tensile strength [MPa] | 2.8 | 2.9 | 2.7 | 3.0 | 2.6 | 2.6 |
| Breaking extension [%] | 360 | 480 | 430 | 610 | 190 | 200 |
| Elastic modulus [MPa] | 3.3 | 2.8 | 3.0 | 2.7 | 5.7 | 5.0 |
| Adhesion V2A to a steel | yes | yes | yes | yes | yes | yes |

From the results of table 2 it is evident that the breaking extensions of the inventive adhesives K5 and K12 are significantly higher than those of the respective reference adhesives K1 and K11, while the tensile strengths are at least as high or higher. In the noninventive adhesive K14, containing polymer 3, the accompanying use of Geniosil® XL 972 provides virtually no increase in breaking extension as compared with the reference adhesive K13.

Examples K15 to K20

The examples K15 to K20 are shown in table 3. The reference adhesives K1, K15 and K16 contain no silane of the formula (I), and K15 likewise contains no aminosilane AS2. The adhesives K7 and K17 to K20 each contain 0.5 part by weight of a silane of the formula (I), as shown in table 3.

TABLE 3

| | K15 ref. | K1 ref. | K16 ref. | K5 inv. | K17 inv. | K18 inv. | K19 inv. | K20 inv. |
|---|---|---|---|---|---|---|---|---|
| Adhesive G1 [ppw] | 99 | 99 | 99 | 99 | 99 | 99 | 99 | 99 |
| A1120 [ppw] | — | 1.0 | 1.5 | 1.0 | 1.0 | 1.0 | 1.0 | 1.0 |
| Silane [0.5 ppw] | — | — | — | XL972 | XL924 | XL65 | XL32 | XL34 |
| Tensile strength [MPa] | 2.7 | 2.8 | 2.8 | 2.9 | 3.2 | 3.0 | 2.9 | 3.1 |
| Breaking extension [%] | 590 | 360 | 290 | 480 | 510 | 430 | 440 | 470 |
| Elastic modulus [MPa] | 1.9 | 3.3 | 3.6 | 2.8 | 3.0 | 3.1 | 3.0 | 2.9 |
| Adhesion V2A to a steel | no | yes | yes | yes | yes | yes | yes | yes |

The results of table 3 show that the inventive adhesives K5 and K17 to K20 exhibit significantly higher breaking extensions than the reference adhesives K1 and K16, while the tensile strengths are either comparably high or higher. The reference adhesive K15, which contains no diaminosilane Silquest® A-1120 (=aminosilane AS2), does have a high breaking extension; its adhesion properties, however, are unsatisfactory.

Examples K21 to K26 (Comparisons)

In comparative examples K21 to K26, silanes were added to the adhesive base formulation G1 that do not correspond to the formula (I). The compositions and results are shown in table 4.

TABLE 4

Comparison adhesive formulations.

| | K1 ref. | K21 comp. | K22 comp. | K23 comp. | K24 comp. | K25 comp. | K26 comp. |
|---|---|---|---|---|---|---|---|
| Adhesive G1 [ppw] | 99 | 99 | 99 | 99 | 99 | 99 | 99 |
| A1120 [ppw] | 1.0 | 1.0 | 1.0 | 1.0 | 1.0 | 1.0 | 1.0 |
| Silane (0.5 ppw] | — | XL926 | XL63 | XL33 | A2120 | A1110 | A1100 |
| Tensile strength [MPa] | 2.8 | 2.9 | 2.9 | 2.8 | 2.8 | 2.1 | 2.4 |
| Breaking extension [%] | 360 | 380 | 390 | 380 | 330 | 190 | 270 |
| Elastic modulus [MPa] | 3.3 | 3.5 | 3.3 | 3.4 | 3.8 | 3.6 | 3.7 |
| Adhesion V2A to a steel | yes | yes | yes | yes | partial | yes | yes |

In table 4 the results of the comparison adhesives K21 to K26 show breaking extensions which are significantly lower than the breaking extensions of the inventive adhesives K5 and K17 to K20 from table 3. As compared with the reference adhesive K1, the breaking extensions of K21 to K23, which contain α-functional trialkoxysilanes, are not significantly increased. Examples K24 to K26 contain γ-functional organo-dialkoxysilanes and have lower breaking extensions than the reference adhesive K1.

c) Preparation of Sealants

Preparation of Sealant Base Formulation (G4)

In a vacuum mixer, 2800 g of polymer 2, 1300 g of diisodecyl phthalate (DIDP; Palatinol® Z. BASF), 800 g of urea thickener, 100 g of vinyltrimethoxysilane (Silquest® A-171, GE Advanced Materials), 4350 g of finely divided coated chalk (Socal® U1S2, Solvay, dried), 600 g of silicone fluid (Dow Corning 200 Fluid, Dow Corning), and 6 g of di-n-butyltin dilaurate were processed to a homogeneous paste which was stored in the absence of moisture.

The urea thickener was prepared as follows:

In a vacuum mixer, 3000 g of diisodecyl phthalate (DIDP; Palatinol® Z, BASF) and 480 g of 4,4'-methylenediphenyl diisocyanate (Desmodur® 44 MC L, Bayer) were introduced as an initial charge and heated slightly. Then 270 g of monobutylamine were added slowly dropwise with vigorous stirring. The resulting paste was stirred further for an hour under reduced pressure and with cooling.

Examples D1 to D9

In a vacuum mixer the sealant base formulation G4 was mixed homogeneously in each case with the silanes indicated in table 5, and the resulting mixtures were stored in the absence of moisture.

TABLE 5

Sealant formulations.

| | D1 ref. | D2 ref. | D3 ref. | D4 inv. | D5 inv. | D6 inv. | D7 inv. | D8 inv. | D9 comp. |
|---|---|---|---|---|---|---|---|---|---|
| Sealant G4 [ppw] | 99.3 | 99.3 | 99.3 | 99.3 | 99.3 | 99.3 | 99.3 | 99.3 | 99.3 |
| A1120 [ppw] | — | 0.35 | 0.7 | 0.35 | 0.35 | 0.35 | 0.35 | 0.35 | 0.35 |
| Silane (0.35 ppw) | — | — | — | XL972 | XL924 | XL65 | XL32 | XL34 | A2120 |
| Tensile strength [MPa] | 1.8 | 1.6 | 1.2 | 1.6 | 1.4 | 1.7 | 1.5 | 1.8 | 1.4 |
| Breaking extension [%] | 980 | 750 | 600 | 910 | 1100 | 940 | 910 | 1050 | 700 |
| Stress at 100% extension [MPa] | 0.33 | 0.35 | 0.36 | 0.33 | 0.25 | 0.39 | 0.31 | 0.33 | 0.41 |
| Shore A | 13 | 23 | 23 | 20 | 16 | 22 | 15 | 18 | 24 |
| Adhesion to Alu elox | no | partial | yes | yes | yes | yes | partial | yes | yes |

The reference sealants D1 to D3 contain no silane (I). Sealants D4 to D8 each contain 0.35 part by weight of a silane of the formula (I). The comparison sealant D9 contains Silquest® A-2120, which does not correspond to the formula (I).

The results show that, for the inventive sealants D4 to D8, breaking extensions are measured which are significantly higher than those for the reference sealants D2 and D3 and for the comparison sealant D9. The reference sealant D1, which contains no diaminosilane Silquest® A-1120 (i.e., aminosilane AS2), does have a high breaking extension; its adhesion properties, however, are unsatisfactory.

The invention claimed is:

1. A moisture-curing composition comprising:
at least one silane-functional polymer A which is a polymer A1 prepared by reacting a polyurethane polymer containing isocyanate groups with an aminosilane AS1 selected from the group consisting of products of a Michael-like addition reaction of 3-aminopropyldiethoxymethylsilane, 3-aminopropyltriethoxysilane, 3-aminopropyldimethoxymethylsilane, and 3-aminopropyltrimethoxysilane with Michael acceptors selected from the group consisting of acrylonitrile, acrylic and methacrylic esters, maleic and fumaric diesters, citraconic diesters, and itaconic diesters,
at least one aminosilane AS2, and
at least one silane of formula (I) in an amount of 0.6 -5.0 parts by weight, based on 100 parts by weight of polymer A,

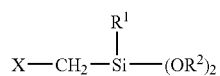
(I)

where:
R$^1$ is an alkyl group having from 1 to 8 C atoms,
R$^2$ is an alkyl group having 1 to 5 C atoms, and
X is a substituent attached via a heteroatom, and wherein said polyurethane polymer is obtained through the reaction of at least one polyisocyanate and at least one polyol.

2. The moisture-curing composition of claim 1, wherein the silane of the formula (I) is present in an amount of 0.6-3.5 parts by weight, based on 100 parts by weight of polymer A.

3. The moisture-curing composition of claim 1, wherein the substituent X attached via a heteroatom is a radical selected from the group consisting of —NHR$^3$, —NHCOOR$^4$, —SH, —OR$^4$, R$^4$COO—, CH$_2$=C(CH$_3$)COO—, and CH$_2$=CHCOO—,
where:
R$^3$ is a hydrogen atom or is a linear or branched hydrocarbon radical having 1 to 20 C atoms, which optionally contains cyclic fractions, or is a radical of the formula (II)

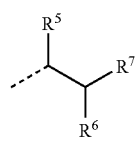
(II)

where:
R$^5$ and R$^6$, independently of one another, is a hydrogen atom or is a radical selected from the group consisting of R$^8$, —COOR$^8$, and —CN, and
R$^7$ is a hydrogen atom or is a radical selected from the group consisting of —CH$_2$—COOR$^8$, —COOR$^8$, —CN, —NO$_2$, —PO(OR$^8$)$_2$, —SO$_2$R$^8$, and —SO$_2$OR$^8$,
where:
R$^8$ is a hydrocarbon radical having 1 to 20 C atoms and optionally contains at least one heteroatom, and
R$^4$ is an optionally substituted hydrocarbon radical having 1 to 20 C atoms.

4. The moisture-curing composition of claim 1, wherein the aminosilane AS2 is a diaminosilane having a primary amino group and, in the position γ to the silicon atom, a secondary amino group.

5. The moisture-curing composition of claim 4, wherein the aminosilane AS2 is an N-(2-aminoethyl)-3-aminopropylsilane.

6. The moisture-curing composition of claim 1, wherein the aminosilane AS2 is present in an amount of 0.1%-5% by weight, based on the overall composition.

7. The moisture-curing composition of claim 1, wherein the silane-functional polymer A is a polymer A1 and in that the aminosilane AS1 has the formula (III)

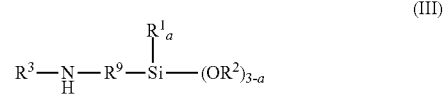
(III)

where:
a is 0 or 1,
R$^3$ is a hydrogen atom or is a linear or branched hydrocarbon radical having 1 to 20 C atoms, which optionally contains cyclic fractions, or is a radical of the formula (II)

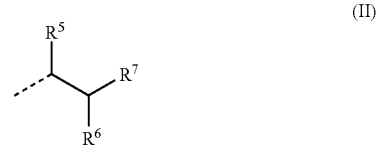
(II)

where:
R$^5$ and R$^6$, independently of one another, is a hydrogen atom or is a radical selected from the group consisting of R$^8$, —COOR$^8$, and —CN, and
R$^7$ is a hydrogen atom or is a radical selected from the group consisting of —CH$_2$—COOR$^8$, —COOR$^8$, —CN, —NO$_2$, —PO(OR$^8$)$_2$, —SO$_2$R$^8$, and —SO$_2$OR$^8$,
where:
R$^8$ is a hydrocarbon radical having 1 to 20 C atoms and optionally containing at least one heteroatom, and
R$^9$ is a linear or branched, optionally cyclic, alkylene group having 2 to 12 C atoms, optionally with aromatic fractions, and optionally with one or more heteroatoms.

8. The moisture-curing composition of claim 7, wherein the aminosilane AS1 is an addition product of 3-aminopropyltrimethoxysilane or 3-aminopropyldimethoxymethylsilane and Michael acceptors.

9. The moisture-curing composition of claim 8, wherein $R^3$ is a radical of the formula (II), where $R^5$ and $R^7$ are each —COOR$^8$, $R^6$ is a hydrogen atom, and $R^8$ is an optionally branched alkyl group having 1 to 8 C atoms.

10. The moisture-curing composition of claim 9, wherein $R^9$ is propylene, $R^2$ is methyl, and a is 0.

11. The moisture-curing composition of claim 1, wherein the aminosilane AS1 is not identical with the aminosilane AS2.

12. The moisture-curing composition of claim 1, wherein the composition is free from isocyanate groups.

13. The moisture-curing composition of claim 1, wherein the composition comprises vinyltrimethoxysilane.

14. A cured composition wherein a moisture-curing composition of claim 1 has been cured via a reaction with water.

15. An adhesive, sealant or coating comprising a moisture-curing composition of claim 1.

16. An adhesive, sealant or coating in industrial manufacture or repair or in civil engineering or construction or interior fitment of means of transport or built structures comprising a moisture-curing composition of claim 1.

17. A method of adhesively bonding substrates S1 and S2, comprising:
   applying a composition of claim 1 to the surface of the substrate S1,
   contacting the surface of the substrate S2 with the composition which is disposed on the substrate S1, and
   curing the composition by contact with moisture,
   wherein the substrates S1 and S2 are the same or different from one another.

18. The method of claim 17, wherein at least one of the substrates S1 or S2, apart from any cleaning carried out with a solvent, is not pretreated by a chemical or physicochemical method.

19. A sealed article produced by the method of claim 18.

20. The sealed article of claim 19, wherein the article is a means of transport or a built structure.

21. The method of claim 17, wherein at least one of S1 or S2 is a metal or a metal alloy.

22. An adhesively bonded article produced by the method of claim 17.

23. The adhesively bonded article of claim 22, wherein the article is a means of transport or a part thereof.

24. A method of sealing comprising
   applying a composition of claim 1 between the surfaces of a substrate S1 and a substrate S2,
   curing the composition by contact with moisture,
   wherein the substrates S1 and S2 are the same or different from one another.

* * * * *